United States Patent
Zhang et al.

(10) Patent No.: US 10,724,485 B2
(45) Date of Patent: Jul. 28, 2020

(54) METHOD AND APPARATUS FOR MANUFACTURING HOLLOW COMPOSITE MAGNETIC MEMBER, AND FUEL INJECTION VALVE

(71) Applicant: Hitachi Automotive Systems, Ltd., Hitachinaka-shi, Ibaraki (JP)

(72) Inventors: Xudong Zhang, Tokyo (JP); Shinya Okamoto, Tokyo (JP); Nobuaki Kobayashi, Hitachinaka (JP); Takahiro Saito, Hitachinaka (JP); Akihiro Yamazaki, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 56 days.

(21) Appl. No.: 15/740,680

(22) PCT Filed: Jun. 9, 2016

(86) PCT No.: PCT/JP2016/067184
§ 371 (c)(1),
(2) Date: Dec. 28, 2017

(87) PCT Pub. No.: WO2017/006693
PCT Pub. Date: Jan. 12, 2017

(65) Prior Publication Data
US 2018/0187640 A1    Jul. 5, 2018

(30) Foreign Application Priority Data
Jul. 7, 2015    (JP) .................... 2015-135987

(51) Int. Cl.
*F02M 61/16*    (2006.01)
*B23K 26/34*    (2014.01)
(Continued)

(52) U.S. Cl.
CPC .......... *F02M 61/166* (2013.01); *B23K 26/064* (2015.10); *B23K 26/0823* (2013.01);
(Continued)

(58) Field of Classification Search
CPC ............. F02M 61/166; F02M 51/0664; F02M 61/168; F02M 61/16; B23K 26/0823; B23K 26/064; B23K 26/354; B23K 2103/05; B23K 26/34; B23P 15/001
See application file for complete search history.

(56) References Cited

U.S. PATENT DOCUMENTS

| | | | | |
|---|---|---|---|---|
| 2002/0153361 | A1* | 10/2002 | Sakamoto | B23K 26/0608 219/121.73 |
| 2005/0161537 | A1* | 7/2005 | Mizuno | F02M 51/005 239/585.1 |

(Continued)

FOREIGN PATENT DOCUMENTS

| | | |
|---|---|---|
| JP | 59-202197 A | 11/1984 |
| JP | 5-57480 A | 3/1993 |

(Continued)

OTHER PUBLICATIONS

English translation of JP4453127 (Year: 2001).*
(Continued)

*Primary Examiner* — Jun S Yoo
(74) *Attorney, Agent, or Firm* — Crowell & Moring LLP (57) ABSTRACT

There is provided a manufacturing method of a hollow composite magnetic member having weakened magnetism in a portion of a ferromagnetic hollow member, the method includes: a step of forming a weak-magnetic area having weakened magnetism by melting and mixing a Ni-containing material and the hollow member by continuously supplying the Ni-containing material to a portion of the hollow member and heating the irradiation area having a line segment shape with the laser beam. Accordingly, since it is possible to prevent drop of a local portion of a hollow ferromagnetic pipe from being easily generated by a weak-magnetization treatment, to greatly reduce deformation generated by laser irradiation, and it becomes unnecessary to adjust the shielding gas pressure inside the pipe, the weak-magnetization treatment can be performed with higher efficiency and higher quality.

6 Claims, 7 Drawing Sheets

(51) Int. Cl.
*B23K 26/064* (2014.01)
*B23K 26/354* (2014.01)
*B23K 26/08* (2014.01)
B23K 103/04 (2006.01)
B23P 15/00 (2006.01)
F02M 51/06 (2006.01)

(52) U.S. Cl.
CPC ............ *B23K 26/34* (2013.01); *B23K 26/354* (2015.10); *F02M 61/16* (2013.01); B23K 2103/05 (2018.08); B23P 15/001 (2013.01); F02M 51/0664 (2013.01); F02M 61/168 (2013.01)

(56) References Cited

U.S. PATENT DOCUMENTS

| | | | | |
|---|---|---|---|---|
| 2011/0057059 | A1* | 3/2011 | Yamamoto | F02M 51/0675 239/584 |
| 2011/0162535 | A1 | 7/2011 | Groll | |
| 2012/0111310 | A1* | 5/2012 | Ryu | B23K 26/0648 125/30.01 |
| 2013/0095582 | A1* | 4/2013 | Miyairi | H01L 51/5246 438/26 |
| 2013/0160935 | A1* | 6/2013 | Matsuo | B29C 55/026 156/229 |
| 2014/0072438 | A1* | 3/2014 | Bruck | B23K 26/082 416/223 R |

FOREIGN PATENT DOCUMENTS

| | | |
|---|---|---|
| JP | 6-142974 A | 5/1994 |
| JP | 8-300175 A | 11/1996 |
| JP | 10-225770 A | 8/1998 |
| JP | 2001-87875 A | 4/2001 |
| JP | 2011-156573 A | 8/2011 |
| WO | WO 2014/070272 A2 | 5/2014 |

OTHER PUBLICATIONS

English translation of JP2001087875 (Year: 2001).*
International Search Report (PCT/ISA/210) issued in PCT Application No. PCT/JP2016/067184 dated Sep. 6, 2016 with English-language translation (Five (5) pages).
Japanese-language Written Opinion (PCT/ISA/237) issued in PCT/JP2016/067184 dated Sep. 6, 2016 (Six (6) pages).
Hindi-language Office Action issued in Indian Application No. 201717046888 dated Feb. 26, 2020 with English translation (six (6) pages).

* cited by examiner

METHOD AND APPARATUS FOR MANUFACTURING HOLLOW COMPOSITE MAGNETIC MEMBER, AND FUEL INJECTION VALVE

TECHNICAL FIELD

The present invention relates to a manufacturing method and a manufacturing apparatus of a hollow composite magnetic member and a fuel injection valve.

BACKGROUND ART

Laser welding is used in various fields because an energy density of the laser beam of the heat source is high and thus low distortion, high speed, and high precision welded joint can be obtained. In the automotive field, there are many products that are welded by stacking or butting together a plurality of materials to be welded to a steel material such as stainless steel or carbon steel, or a metallic material such as an aluminum alloy or a nickel alloy. For example, in the manufacturing of a vehicle body, a fuel pump, an injector (fuel injection valve), and a welding process using a pulse wave or a continuous wave laser light is used.

In addition, in order to improve structure and performance of the surface or a portion of the metallic material, an additive material (wire or powder) having a different component from that of the metallic material is used, and surface reforming for improving the local structure and performance of the metallic material by laser beam irradiation is also applied to a wide range of products.

For example, in order to improve the responsiveness of fuel injection valves used in the automobile field, a local non-magnetic or low-magnetization treatment is performed on the pipe-shaped magnetic material.

However, for a thin pipe, a drop of a reformed portion into an inside surface of the pipe is generated by the laser irradiation and a shape adjustment step is necessary after the low-magnetization treatment.

The reason for the generation of the drop described above is that when irradiating a predetermined low-magnetization treatment area with the laser beam, since a width of a treatment area required from the performance of the fuel injection valve can be obtained, it is necessary to set the laser beam spot diameter to increase or to set the heat input amount of the laser beam to increase. In this case, there is a case where melting down is generated or a case where the thin pipe is greatly deformed, by an increase in the amount of heat input to the thin pipe.

In order to solve the problem of the drop described above, PTL 1 describes a method of performing laser irradiation while supplying a non-oxidizing shielding gas inside the pipe.

CITATION LIST

Patent Literature

PTL 1: JP-A-2001-87875

SUMMARY OF INVENTION

Technical Problem

However, although the laser reforming method described in PTL 1 has an effect of suppressing a drop by providing a shielding gas inside the pipe, since the heat input amount of the entire laser is still high, a reduction effect against deformation is not obtained. In addition, in a case where the dimensions such as pipe wall thickness and low-magnetization treatment width are changed since there is a need to adjust the pressure of the shielding gas, it is not easy to realize a stable process in which the drop is not generated.

The present invention is realized in view of the problems of the related art and an object thereof is to provide a method for reducing deformation of a low-magnetization treatment area and an apparatus therefor when welding is performed with a laser beam in a state where pressure adjustment by a shield gas supplied to the inside of the hollow member is not performed.

Solution to Problem

According to the present invention, there is provided a manufacturing method of a hollow composite magnetic member having weakened magnetism in a portion of a ferromagnetic hollow member, the method including: a step of forming a weak-magnetic area having weakened magnetism by melting and mixing a Ni-containing material and the hollow member by continuously supplying the Ni-containing material to a portion of the hollow member and heating the irradiation area having a line segment shape with the laser beam.

Advantageous Effects of Invention

According to the present invention, since it is possible to prevent the drop of a local portion of a hollow ferromagnetic pipe from being easily generated by a weak-magnetization treatment, greatly reduce deformation generated by laser irradiation, and it becomes unnecessary to adjust the shielding gas pressure inside the pipe, the weak-magnetization treatment can be performed with higher efficiency and higher quality.

DESCRIPTION OF EMBODIMENTS

The present invention relates to a laser processing method such as surface reforming, overlaying or welding by a laser heat treatment in which a wire is added using a linear heating system, and a laser processing apparatus for realizing the same.

In a weak-magnetization treatment method of a ferromagnetic pipe for a fuel injection valve for weakly magnetizing a portion of a ferromagnetic pipe for a fuel injection valve, the portion of the ferromagnetic pipe for the fuel injection valve is weakly magnetized by melting the Ni-containing material and the ferromagnetic pipe for the fuel injection valve by a laser beam of a linear heating system while the Ni-containing material is continuously supplied to the portion of the ferromagnetic pipe for the fuel injection valve.

Preferably, the sectional shape of the continuously supplied Ni-containing additive material (Ni-containing material) has either a solid or hollow circular shape, an elliptical shape or a rectangular shape and uses a single-core solid wire or a multi-core strand wire.

In addition, it is preferable that a length of an irradiation range of the laser beam of the linear heating system is 1 time or more and less than 2 times the width of a weak-magnetization treatment area and the width of the irradiation range is 1.0 time or less the diameter of the Ni-additive material.

The laser beam of the linear heating system can use a linear beam formed of a cylindrical lens or a diffraction type lens or use a high-speed beam scanner which performs high-speed reciprocal scanning of a circular beam to form a linear irradiation area.

The laser processing apparatus of the present invention for realizing the laser weak-magnetization treatment process described above is an apparatus that includes either (A laser beam forming unit) a beam conversion head that can adjust the length and width of the laser irradiation range of the linear heating system or a beam scanner that performs a high-speed reciprocating scanning of the circular beam and that is obtained by a combination of mechanisms (material supplying units) which can continuously supply Ni-additive material (Ni-containing material).

Hereinafter, embodiments of the present invention will be described with reference to the drawings or the like. The following description describes concrete examples of the contents of the present invention and the present invention is not limited to these description and various modifications and correction by those skilled in the art within the scope of the technical idea disclosed in this specification are possible.

Example 1

A welding method according to the example of the present invention is as follows with reference to FIG. 1 to FIG. 5B.

Figure 1:
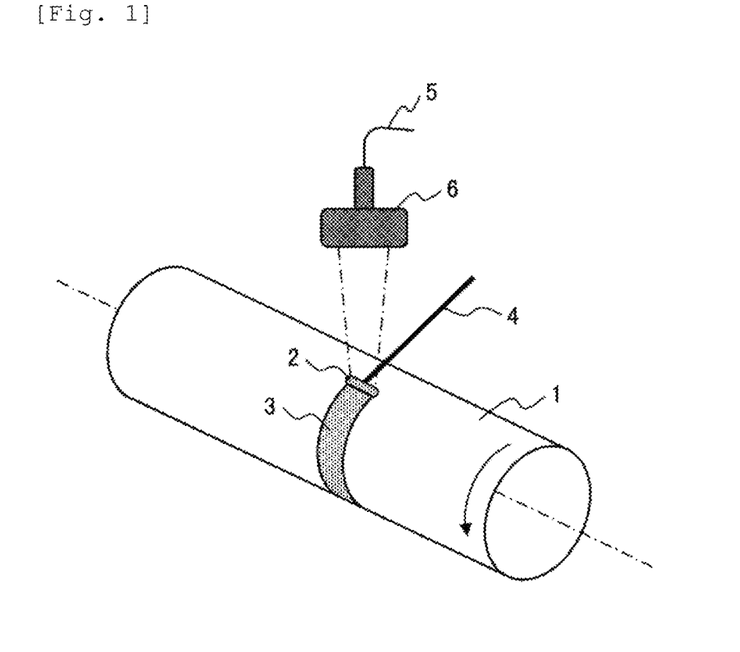
FIG. 1 is a perspective view schematically illustrating laser weak-magnetization treatment according to the present invention.

FIG. 1 is a view illustrating a weak-magnetization treatment of a ferromagnetic pipe (disposition of ferromagnetic pipe, wire, and laser light irradiation portion used for manufacturing a hollow composite magnetic member (pipe)). Here, the hollow composite magnetic member means a hollow ferromagnetic member (ferromagnetic pipe) having a partially weakened magnetic portion.

The ferromagnetic pipe 1 includes a metal pipe or the like formed of a magnetic metallic material such as electromagnetic stainless steel, for example. The shape of the metal pipe is not limited to the cylindrical shape and generally may be a hollow member (hollow member).

As the ferromagnetic pipe 1, for example, a pipe material of a ferrite type stainless steel SUS 430 having a wall thickness of 0.5 mm can be used. The ferromagnetic pipe 1 has Cr of 15 mass % or more and 18 mass % or less. As such a metal, for example, metals containing Cr of 16.49 mass %, Si of 0.44 mass %, Ni of 0.19 mass %, C of 0.01 mass % and Mn of 0.25 mass % may be contained.

A laser light is generated from a laser transmitter (not illustrated), converted to a linear beam by a linear beam conversion head 6 via a transfer path such as a transfer fiber 5, and a laser light (linear beam) is irradiated on a surface of the ferromagnetic pipe 1. Reference numeral 2 indicates the irradiation area thereof.

A wire 4 containing Ni (Ni-containing material) is applied to the ferromagnetic pipe 1, and the non-magnetization treatment of the ferromagnetic pipe 1 is performed by laser heat from the laser transmitter. Ni is added to the ferromagnetic pipe 1 at a portion subjected to the non-magnetization treatment.

For example, although a fiber laser having a wavelength of 1070 to 1080 nm can be used in the laser weak-magnetization treatment of this example illustrated in FIG. 1, laser light having other wavelengths may be used.

The irradiation shape serving as the irradiation range (irradiation area 2) of the laser beam of the linear heating system is a linear shape (line segment shape). As illustrated in FIG. 1, a ferromagnetic pipe 1 is installed in an irradiation target installation unit (not illustrated) so that the longitudinal direction of the irradiation area 2 is parallel to a rotation axis of the ferromagnetic pipe 1, and the laser is irradiated.

While rotating the ferromagnetic pipe 1 by an irradiation target rotation unit (not illustrated), a wire 4 having a diameter of 0.6 mm is continuously supplied to the pipe surface by a wire supplying device (not illustrated, also referred to as "material supplying unit") and the wire 4 and the surface local portions of the pipe 1 are simultaneously melted by the linear beam 2 to form the weak-magnetization treatment area 3. The weak-magnetization treatment area 3 is annularly formed on the side surface of the ferromagnetic pipe 1.

FIG. 2A to FIG. 2D illustrate variations of the sectional shape of the wire.

Figure 2A:
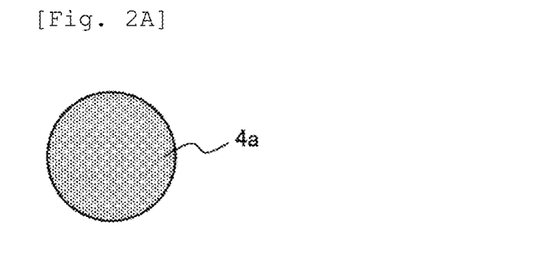
FIG. 2A is a sectional view illustrating a shape of a Ni-additive material used in laser weak-magnetization treatment according to the present invention.

The wire 4a in FIG. 2A is a solid wire having a circular cross section and has a diameter of 0.6 mm.

Figure 2B:
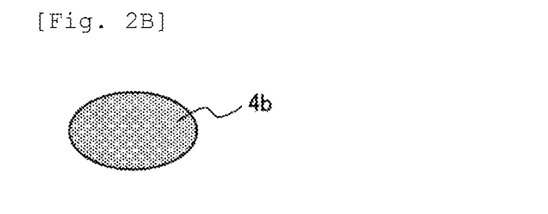
FIG. 2B is a sectional view illustrating the shape of the Ni-additive material used in the laser weak-magnetization treatment according to the present invention.
Figure 2C:
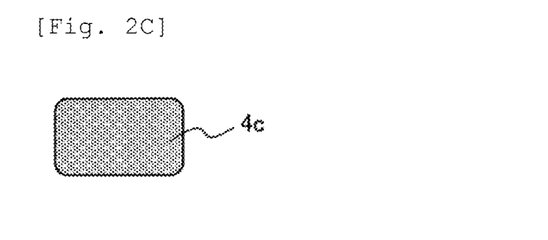
FIG. 2C is a sectional view illustrating the shape of the Ni-additive material used in the laser weak-magnetization treatment according to the present invention.

The wire 4b in FIG. 2B is an elliptical solid wire. The wire 4c in FIG. 2C is a rectangular solid wire. In order to obtain the effect of weak-magnetization, it is necessary to secure the amount of wire to be added. Compared to a circular wire, in a case where an elliptical or rectangular wire is used, since the dimension thereof in the narrow direction becomes small, there is an advantage that it is likely to be melted by a linear beam. Circular wires are more advantageous in costs than elliptical or rectangular wires.

Figure 2D:
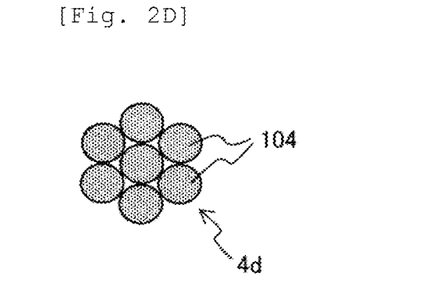
FIG. 2D is a sectional view illustrating the shape of the Ni-additive material used in the laser weak-magnetization treatment according to the present invention.

In FIG. 2A to FIG. 2C, although a single-core solid wire is illustrated, a multi-core strand wire may be used. The wire 4d in FIG. 2D is a multi-core strand wire. Each wire 104 constituting a strand has a circular cross section.

Figure 3:
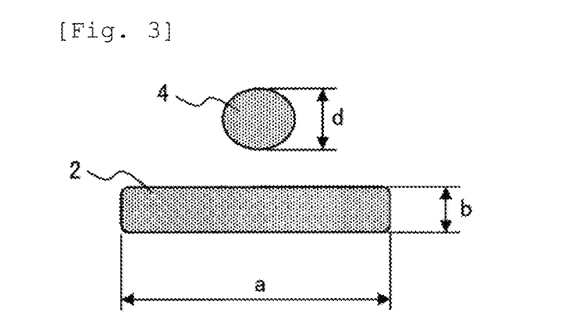
FIG. 3 is a view illustrating a diameter of a Ni wire and a shape of a linear laser beam used in the laser weak-magnetization treatment of the present invention.

FIG. 3 is a view illustrating the sectional shape and dimensions of the single-core solid wire used in this example and the laser beam shape (linear beam) irradiated on the surface of the pipe, that is, the shape and dimensions of the irradiation area of the laser beam on the surface of the pipe, respectively.

In FIG. 3, reference numeral 4 denotes a cross section of the wire. Reference numeral 2 denotes the laser beam shape (shape and dimension of irradiation area) irradiated on the pipe surface. d is the diameter of the wire 4. b is the width (short side) of the irradiation area. a is the length (long side) of the irradiation area.

In the present example, although the diameter d of the wire is 0.6 mm and the width b of the irradiation area is 0.5 mm, it is possible to appropriately change the wire diameter and the width of the irradiation area. However, in order to minimize the deformation associated with the weak-magnetization treatment, it is preferable that a relationship between the wire diameter d and the width b of the irradiation area follows the following (Expression 1).

$$b/d \leq 1.0 \qquad \text{(Expression 1)}$$

Here, in a case where the cross section of the wire is elliptical, the diameter (width) of the cross section of the wire in a traveling direction of laser irradiation is d. For example, in a case as illustrated in FIG. 3 (traveling direction of laser irradiation is upward or downward in drawing), the diameter in the narrow width direction of the ellipse is d. In general, regardless of the sectional shape of the wire, the width of the cross section of the wire in the traveling direction of laser irradiation is d.

The need to satisfy the b/d≤1.0 will be explained.

In order to minimize the deformation by laser irradiation, it is necessary to control so that the width direction of the linear beam is not irradiated on the pipe area other than the wire. When the width b of the irradiation area becomes larger than the wire diameter d, the laser beam irradiation area a×b determined by the length a and width b of the irradiation area also increases.

In order to simultaneously melt the wire and a pipe weak-magnetization treatment area, it is necessary that a predetermined laser power density (laser output applied to unit area, W/mm$^2$) applies to the wire. In a case where the irradiation range is too wide with respect to the wire, since the density of the laser output decreases, sufficient melting cannot be performed and the effect of weak-magnetization treatment is lowered. Therefore, it is necessary to raise the overall output in order to irradiate the same laser output to the wire. However, if the overall output is raised, since the heat input amount increases at a location in which the laser power density is not applied to the wire, there is a problem that deformation of the pipe becomes large. Therefore, it is preferable that the laser irradiation is linear and it is further preferable that the sizes b and d are adjusted so as to have the relationship as described above.

For example, in this example, a wire having a diameter of 0.6 mm is used, and the range of the weak-magnetization treatment area of the ferromagnetic pipe is 2.5 mm and in this case, the dimension of the irradiation area is set to 0.6=×2.5 mm. However, in a case of using the circular beam of the related art, it is necessary to set the beam spot diameter to 2.5 mm in order to obtain the same weak-magnetization treatment area of 2.5 mm. As a result, the laser irradiation area is four times or more than that of the linear beam. In a case where a laser with the same output is used, in a case of a circular beam, since the power density thereof is lower than that of the linear beam, in order to irradiate the wire with sufficient power, a higher output than the linear beam is required. In a case where it is a high output, since the high power laser is irradiated over a wide range, there is a possibility that the deformation of the pipe increases.

Next, the length a of the irradiation area of the linear beam used in the present example will be described in detail with reference to FIG. 4.

Figure 4:
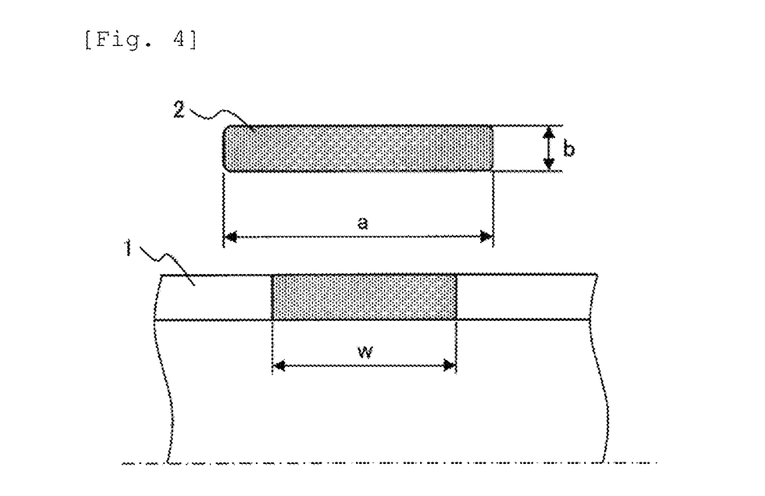
FIG. 4 is a view illustrating the shape of the linear laser beam and a width of a treatment area used in the laser weak-magnetization treatment of the present invention.

FIG. 4 illustrates the irradiation area 2 of the linear beam and a portion of the cross section of the ferromagnetic pipe 1. The long side of the irradiation area 2 and the cross section of the ferromagnetic pipe 1 illustrated in this drawing are parallel to a rotation axis of the ferromagnetic pipe 1.

An optimum range is provided for the width w of the weak-magnetization treatment area (weak-magnetic area) from a viewpoint of responsiveness of the fuel injection valve. For example, the width w is 2.5 mm. In general, since the range melted by laser irradiation is slightly narrower than the length a of the irradiation area by the influence of the heat conduction of the pipe itself and the heat transfer of the environment, when the length a of the irradiation area is set to be smaller than w, the weak-magnetization treatment area is narrowed, and the response performance decreases. Therefore, it is important to be 1.0≤a/w.

On the other hand, if a/w is set to 2.0 or more, the irradiation range of the laser is too wide, and the width w of the weak-magnetization treatment area is significantly larger than the required 2.5 mm. As a result, the deformation increases and the responsiveness decreases.

Therefore, in a case where the length a of the irradiation area of the linear beam of the laser and the width w of the required weak-magnetization treatment area are set such that the linear length in the wide direction is a and the width of the ferromagnetic pipe for the fuel injection valve on which the weak-magnetization treatment is w, a is preferably 1 time or more and less than 2 times w and it is preferable to satisfy the following (Expression 2).

$$1.0 \leq a/w < 2.0 \qquad \text{(Expression 2)}$$

Figure 5A:
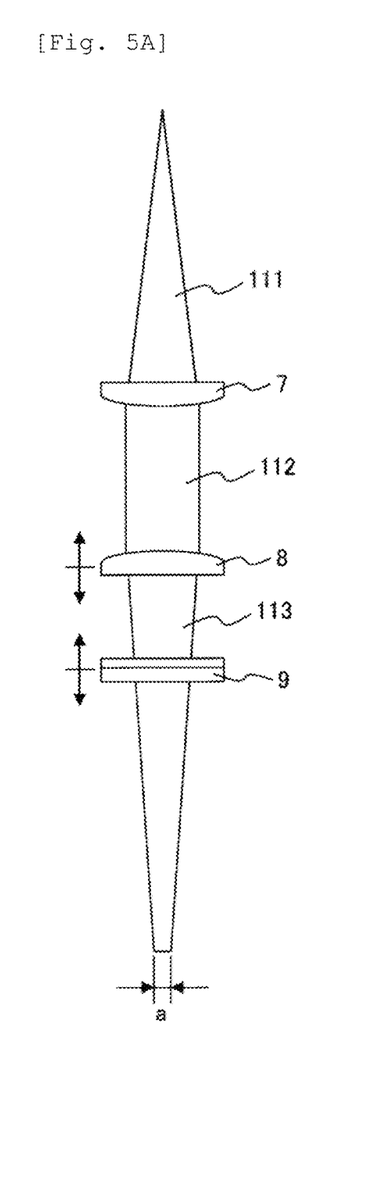
FIG. 5A is a schematic side view illustrating a configuration of a linear beam conversion head including a cylindrical lens used in an apparatus of the present invention.
Figure 5B:
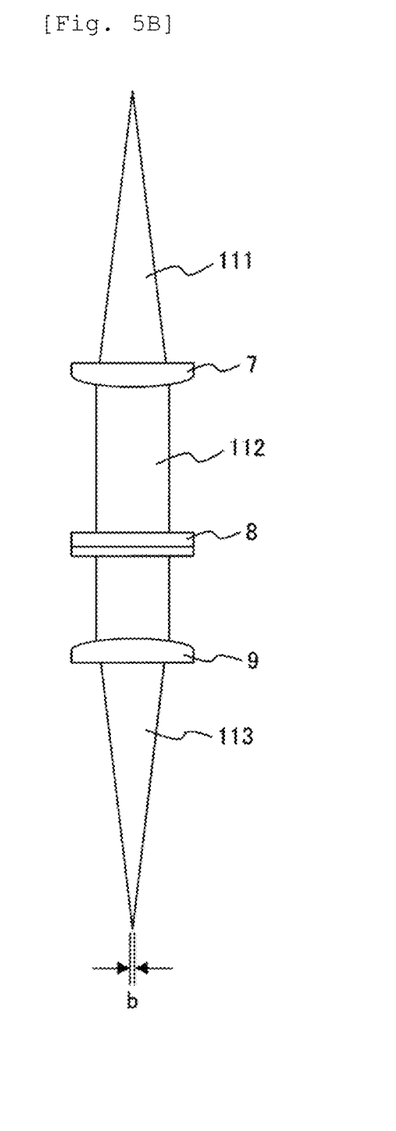
FIG. 5B is a schematic side view illustrating the configuration of the linear beam conversion head including the cylindrical lens used in the apparatus of the present invention.

FIG. 5A and FIG. 5B illustrate the beam conversion head used in this example. These drawings illustrate the disposition of the lenses for realizing the shape of the irradiation area of the linear beam.

Specifically, the laser beam 111 from the transfer fiber is converted into a parallel beam 112 by a collimation lens 7. Thereafter, the laser beam is transformed into a linear beam 113 using two cylindrical lenses 8 and 9. These configurations are included in the laser beam forming unit.

FIG. 5A illustrates a surface corresponding to the length a of the irradiation area of the linear beam 113. FIG. 5B illustrates a surface corresponding to the width b of the irradiation area of the linear beam 113.

Although the cylindrical lens 8 converges in the longitudinal direction of the linear beam, the lens does not converge in the width direction. In contrast, the lens 9 does not converge in the longitudinal direction of the linear beam. By combining the lenses 8 and 9, a linear beam having a predetermined shape is obtained.

In addition, in consideration of the change in the shape of the weak-magnetization treatment pipe and the dimension of the treatment area, a mechanism that can adjust the vertical positions of the cylindrical lenses 8 and 9 of the present invention is provided.

Laser weak-magnetization treatment conditions used in this example are, for example, laser output of 300 W to 1000 W, linear beam length a of 2.5 mm to 5.0 mm, width b of 0.05 mm to 0.6 mm, and the treatment speed can be appropriately set at 10 mm/s to 100 mm/s by rotation of the pipe. In addition, nitrogen gas is used as a shielding gas in order to prevent oxidation of the melted molten metal during the laser irradiation period.

As a result of treatment of the ferromagnetic pipe under the weak-magnetization treatment conditions described above, it was confirmed that the dimension and magnetic characteristics of the magnetization treatment portion satisfy the required values, and the deformation of the entire pipe is also small.

Example 2

A welding method of Example 2 of the present invention is as follows. The ferromagnetic pipe used in this example is the same as that used in Example 1.

In the laser weak-magnetization treatment of this example, for example, although a visible light and a near-infrared laser having a wavelength of 500 nm to 880 nm can be used, laser light of other wavelengths may be used. The other apparatus configuration is set in the same manner as in FIG. 1 of Example 1. A laser light is generated from a laser transmitter (not illustrated), converted to a linear beam 2 by a linear beam conversion head 6 via a transfer path such as a transfer fiber 5, and a laser light is irradiated onto the surface of the ferromagnetic pipe 1.

Similarly to the method described in Example 1 of the present invention, the weak-magnetization treatment method continuously supplies a Ni wire 4 with a diameter of 0.6 mm to a pipe surface by a wire supplying device (not illustrated) while rotating the ferromagnetic pipe 1, and the wire 4 and the surface local portion of the pipe 1 are simultaneously melted by a linear beam to form a weak-magnetization treatment area 3.

Although the Ni wire used in this example is a circular strand wire having a diameter of 0.8 mm, elliptical or rectangular solid wires illustrated in FIG. 2B and FIG. 2C may be used.

Figure 6:
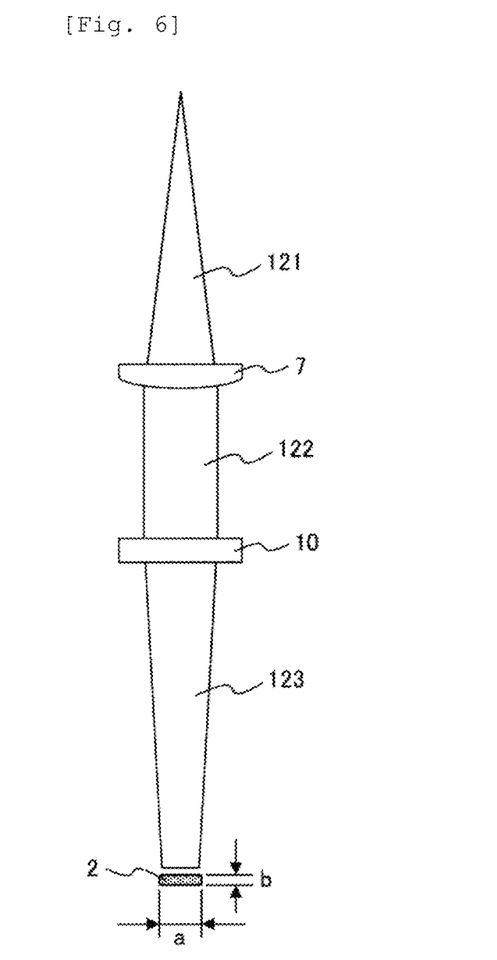
FIG. 6 is a schematic side view illustrating a configuration of a linear beam conversion head including a diffraction type lens used in the apparatus of the present invention.

FIG. 6 illustrates a configuration of the linear beam conversion head used in this example.

Specifically, the laser beam 121 from the transfer fiber is converted into a parallel beam 122 by the collimation lens 7. Thereafter, the laser beam is converted into a linear beam 123 by the diffraction type conversion lens 10. These configurations are included in the laser beam forming unit.

The beam shape converted by the diffraction type conversion lens 10 is as follows. The relationship between the length a of the irradiation area 2 of the linear beam and the width w of the weak-magnetization treatment area is $1.0 \leq a/w < 2.0$ and the relationship between the width b of the irradiation area 2 of the linear beam and diameter d of the Ni wire is $b/d \leq 1.0$.

Laser weak-magnetization treatment conditions used in this example are, for example, a laser output of 600 W to 1200 W, a length a of the irradiation area 2 of the linear beam of 2.5 mm to 5.0 mm, a width b of 0.1 mm to 0.8 mm, and the treatment speed can be appropriately set at 10 mm/s to 100 mm/s by rotating the pipe. In addition, argon gas was used as a shielding gas in order to prevent oxidation of molten metal being molten, during the laser irradiation period.

As a result of performing a treatment of the ferromagnetic pipe under the weak-magnetization treatment conditions described above, the dimension and magnetic characteristics of the magnetization treatment portion satisfy the required values, and weak-magnetization portion is obtained without the deformation and small defects of the entire pipe.

Example 3

The welding method of Example 3 of the present invention is as follows. Conditions such as the ferromagnetic pipe, laser wavelength, wire diameter, or the like used in this example are the same as those used in Example 1.

Figure 7:
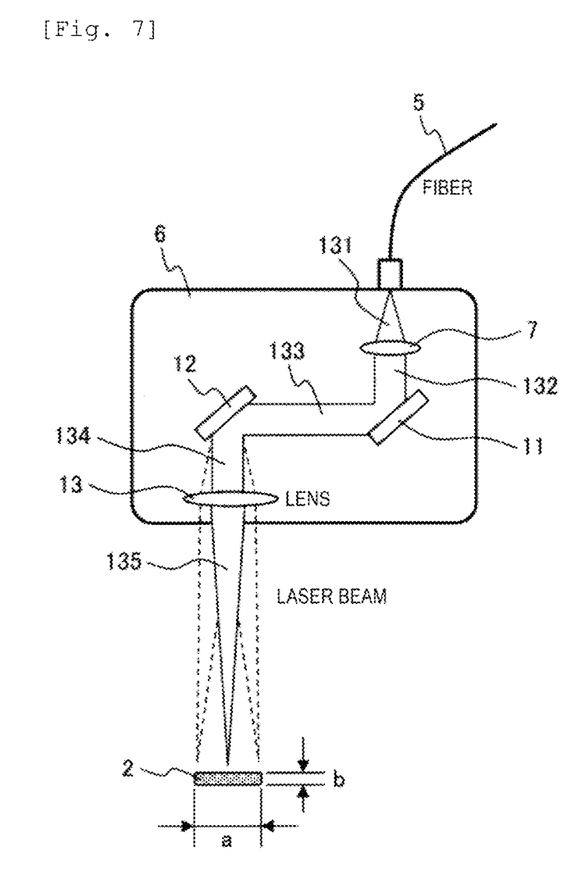
FIG. 7 is a schematic configuration diagram illustrating a linear beam conversion head including a high-speed scanner used in the apparatus of the present invention.

FIG. 7 illustrates the configuration of the linear beam conversion head used in this example.

Specifically, the laser beam 131 transferred from the transfer fiber 5 is converted into a parallel beam 132 by the collimation lens 7, reflected by the reflection mirror 11, and becomes a beam 133. Thereafter, the beam 133 becomes the beam 134 by the galvanometer mirror 12. The beam 134 is converted into a linear beam 135 by the lens 13. The beams 134 and 135 are scanned at high speed by the galvanometer mirror 12. Although the beam 135 becomes a beam having a point shape at the focal point, the beam acts as a linear beam by being scanned by the galvanometer mirror 12. The broken line illustrates the scanning range of the beams 134 and 135. These configurations are included in the laser beam forming unit.

The relationship between the length a of the range scanned by the galvanometer mirror 12 and the width w of the weak-magnetization treatment area is $1.0 \leq a/w \leq 2.0$ and the relationship between the width b of the range to be scanned and the diameter d of the Ni wire is $b/d \leq 1.0$.

The laser weak-magnetization treatment conditions of this example are the same as those in Example 1. Specifically, the laser output can be set to 600 W to 1200 W, the linear beam length a can be set to 2.5 mm to 5.0 mm, the width b can be set to 0.1 mm to 0.8 mm, the treatment speed by the rotation of the pipe can be set to 10 mm/s to 100 mm/s as appropriate. In addition, nitrogen gas was used as the shielding gas, during the laser irradiation period.

As the implementation result using the weak-magnetization treatment conditions described above, the dimension and the magnetic characteristics of the weak-magnetization treatment portion satisfy the required values and weak-magnetization portion is obtained without the deformation and small defects of the entire pipe.

Finally, an example of a fuel injection valve using a pipe which is a hollow composite magnetic member of the present invention is illustrated.

Figure 8:
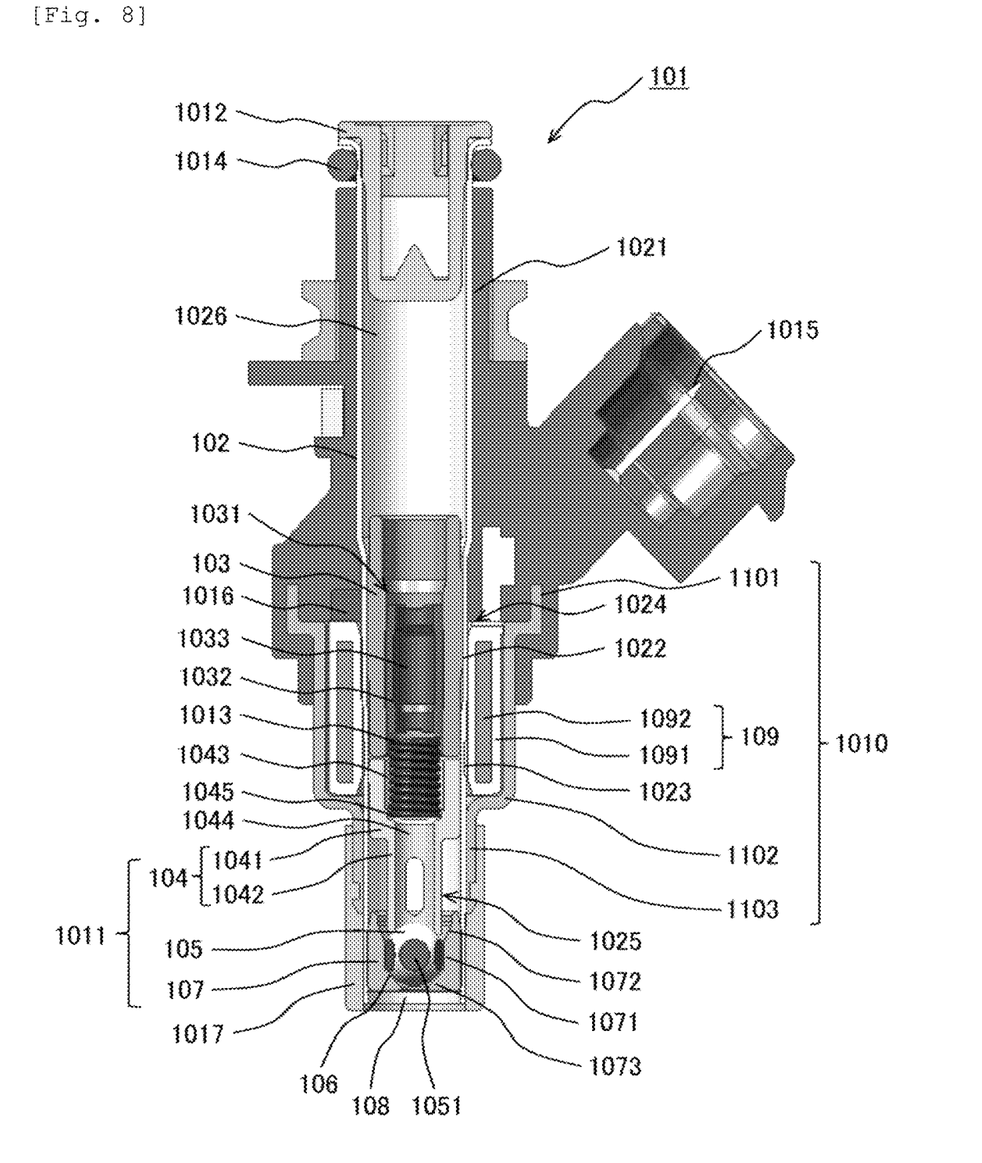
FIG. 8 is a longitudinal sectional view illustrating a fuel injection valve using a pipe which is a hollow composite magnetic member of the present invention.

FIG. 8 is a longitudinal sectional view illustrating a fuel injection valve using the pipe of the present invention.

In this drawing, the fuel injection valve 101 is used for an automotive gasoline engine, and is a low pressure fuel injection valve that injects fuel toward the inside of the intake manifold. Hereinafter, in FIG. 8, an upper side of the paper surface of the fuel injection valve 101 is referred to as an upstream, and a lower side of the paper surface is referred to as a downstream.

The fuel injection valve 101 includes a pipe 102 which is mainly formed from a ferromagnetic material, a core 103 which is accommodated in the pipe 102, an anchor 104, a valve body 105 which is fixed to the anchor 104, a valve seat member 107 which has a valve seat 106 closed by the valve body 105 when the valve is closed, a nozzle plate 108 which has a fuel injection hole through which fuel is injected when the valve is opened, an electromagnetic coil 109 which operates the valve body 105 in the valve opening direction when being energized, and a yoke 1010 which induces magnetic flux lines.

The pipe 102 is made of a metal pipe or the like made of a magnetic metallic material such as electromagnetic stainless steel and is formed in a stepped cylindrical shape by using means such as press processing such as deep drawing and grinding processing. The pipe 102 has a large diameter portion 1021 and a small diameter portion 1022 having a smaller diameter than the large diameter portion 1021. The pipe 102 has a circular sectional shape.

In the small diameter portion 1022, a thin-walled portion 1023 with a thin-walled portion which is partially thinned is formed. The small diameter portion 1022 is divided into a core accommodation portion 1024 which accommodates the core 103 on the upstream side of the thin-walled portion 1023 and a valve member accommodation portion 1025 which accommodates the valve member 1011 including the anchor 104, the valve body 105 and the valve seat member 107 on the downstream side from the thin-walled portion 1023. In a state where the core 103 and the anchor 104 are accommodated in the pipe 102, the thin-walled portion 1023 is formed so as to surround a gap portion (area where core 103 and anchor 104 face each other) between the core 103 and the anchor 104. The core 103 and the anchor 104 are opposed to each other with a gap therebetween. Further, this portion and the inner wall of the pipe 102 are opposed to each other, and a thin-walled portion 1023 is formed in this location of the pipe 102, and a reformed portion is provided in this portion as described below.

The thin-walled portion 1023 increases the magnetic resistance between the core accommodation portion 1024 and the valve member accommodation portion 1025 and magnetically shields the core accommodation portion 1024 from the valve member accommodation portion 1025.

A fuel passage 1026 that sends fuel to the valve member 1011 is formed inside the large diameter portion 1021, and a fuel filter 1012 for filtering fuel is provided on the upstream side of the large diameter portion 1021.

The core 103 is formed in a cylindrical shape having a hollow portion 1031 and press-fitted into the core accommodation portion 1024 of the pipe 102. A spring receiving member 1032 fixed by press-fitting or the like is accommodated in the hollow portion 1031. At the center of the spring receiving member 1032, a fuel passage 1033 penetrating in the axial direction is formed.

The anchor 104 is formed by a magnetic member and fixed to the valve body 105 on the downstream side thereof by welding. The anchor 104 has a large diameter portion 1041 which has an outer diameter slightly smaller than the inner periphery of the small diameter portion 1022 of the pipe 102 on the upstream side thereof and a small diameter portion 1042 having a smaller outer diameter than that of the large diameter portion 1041.

A spring accommodation portion 43 is formed inside the large diameter portion 1041. The inner diameter of the spring accommodation portion 1043 is formed to be substantially the same as the inner diameter of the hollow portion 1031 of the core 103. A fuel passage hole 1044, which is a through-hole having a smaller diameter than the inner circumference of the spring accommodation portion 1043, is formed in a bottom portion of the spring accommodation portion 1043. A spring receiving portion 1045 is provided at the bottom portion of the spring accommodation portion 1043.

The outer shape of the valve body 105 is substantially spherical, and a fuel passage 1051 cut and perforated parallel to the axial direction of the fuel injection valve 101 is provided on the outer peripheral surface.

A substantially conical valve seat 106, a valve body holding hole 1071 which is formed substantially at the same diameter as the diameter of the valve body 104 on the upstream side of the valve seat 106, an upstream opening portion 1072 which is formed to have a larger diameter toward the upstream side from the valve body holding hole 1071, and a downstream opening portion 1073 which is opened on the downstream side of the valve seat 106 are formed on the valve seat member 107. The valve seat 106 is formed such that a diameter thereof decreases from the valve body holding hole 1071 toward the downstream opening portion 1073, and the valve body 105 is seated on the valve seat 106 when the valve is closed. On the downstream side of the valve seat member 107, a nozzle plate 108 is welded.

The anchor 104 and the valve body 105 are disposed in the pipe 102 so as to be capable of being operated in the axial direction. A coil spring 1013 is provided between the spring receiving portion 1045 of the anchor 104 and the spring receiving member 1032 to urge the anchor 104 and the valve body 105 toward the downstream side thereof. The valve seat member 107 is inserted into the pipe 102 and fixed to the pipe 102 by welding. An O-ring 1014 is provided on the outer periphery of the upstream portion of the pipe 102 for connecting to a pipe of a pump that sends fuel.

An electromagnetic coil 109 is disposed on the outer periphery of the core 103 of the pipe 102. The electromagnetic coil 109 includes a bobbin 1091 which is formed of a resin material and a coil 1092 which is wound around the bobbin 1091. The coil 1092 is connected to the electromagnetic coil control device via a connector pin 1015.

The yoke 1010 has a hollow through-hole and includes a large diameter portion 1101 which is formed on the upstream side, a medium diameter portion 1102 which is formed to be smaller in diameter than the large diameter portion 1101, and a small diameter portion 1103 which is formed to be smaller in diameter than the medium diameter portion 1102 and formed on the downstream side thereof. The small diameter portion 1103 is fitted into the outer periphery of the valve member accommodation portion 1025. An electromagnetic coil 109 is disposed on the inner peripheral portion of the medium diameter portion 1102. A connection core 1016 is disposed on the inner periphery of the large diameter portion 1101.

The connection core 1016 is made of a magnetic metallic material or the like. The large diameter portion 1101 and the pipe 102 are connected by the connection core 1016. In other words, the yoke 1010 is connected to the pipe 102 in the small diameter portion 1103 and the large diameter portion 1101, and magnetically connected to the pipe 102 at both end portions of the electromagnetic coil 109. A protector 1017 for protecting the tip of the pipe 102 is attached to the downstream side of the yoke 1010.

When power is supplied to the electromagnetic coil 109 via the connector pin 1015, a magnetic field is generated, and the anchor 104 and the valve body 105 are opened against the urging force of the coil spring 1013 by the magnetic force of this magnetic field. Accordingly, the fuel supplied from the pump is injected into a combustion chamber of the engine.

REFERENCE SIGNS LIST

1: ferromagnetic pipe, 2: irradiation area, 3: weak-magnetization treatment area, 4: wire, 5: transfer fiber, 6: beam conversion head, 7: collimation lens, 8: cylindrical lens, 9: cylindrical lens, 10: diffraction type lens, 11: reflection mirror, 12: galvanometer mirror, 13: condensing lens, 101:

fuel injection valve, 102: pipe, 103: core, 104: anchor, 105: valve body, 106: valve seat, 107: valve seat member, 108: nozzle plate, 109: electromagnetic coil, 1010: yoke, 1011: valve member, 1012: fuel filter, 1013: coil spring, 1014: O-ring, 1015: connector pin, 1016: connection core, 1017: protector, 1021: large diameter portion (of pipe), 1022: small diameter portion (of pipe), 1023: thin-walled portion, 1024: core accommodation portion, 1025: valve member accommodation portion, 1026: fuel passage (of pipe), 1031: hollow portion (of core), 1032: spring receiving member, 1033: fuel passage (of core), 1041: large diameter portion (of anchor), 1042: small diameter portion (of anchor), 1043: spring accommodation portion, 1044: fuel passage hole (of anchor), 1045: spring receiving portion (of anchor), 1051: fuel passage (of valve body), 1071: valve body holding hole, 1072: upstream opening portion, 1073: downstream opening portion, 1091: bobbin, 1092: coil, 1101: large diameter portion (of yoke), 1102: medium diameter portion (of yoke), 1103: small diameter part (of yoke).

The invention claimed is:

1. A manufacturing method of a hollow composite magnetic member having weakened magnetism in a portion of a ferromagnetic hollow member, the method comprising:

a step of forming a weak-magnetic area having weakened magnetism by melting and mixing a Ni-containing material and the hollow member by continuously supplying the Ni-containing material to a portion of the hollow member and heating an irradiation area having a line segment shape with a laser beam, wherein the Ni-containing material is a single-core solid wire of which cross section is a solid or hollow circular shape, an elliptical shape or a rectangular shape, or a strand wire in which a single-core solid wire of which cross section is a solid or hollow circular shape, an elliptical shape or a rectangular shape is twisted a plurality of times, a length of a short side of the irradiation area is b, a diameter of the cross section of the Ni-containing material is d, and a relationship of $b/d \leq 1.0$ is satisfied.

2. The manufacturing method of a hollow composite magnetic member according to claim 1, wherein the hollow member is rotated when the irradiation area is heated.

3. The manufacturing method of a hollow composite magnetic member according to claim 1, wherein in a case where a length of a long side of the irradiation area is a and a width of the weak-magnetic area in the cross section parallel to the long side of the irradiation area is w, a is 1 time or more and less than 2 times w.

4. The manufacturing method of a hollow composite magnetic member according to claim 1, wherein the laser beam is formed by a cylindrical lens.

5. The manufacturing method of a hollow composite magnetic member according to claim 1, wherein the irradiation area having the line segment shape is formed by scanning a laser beam having a point shape.

6. The manufacturing method of a hollow composite magnetic member according to claim 1, wherein b=0.5 mm and d=0.6 mm.

* * * * *